(12) United States Patent
McCormack et al.

(10) Patent No.: US 8,010,607 B2
(45) Date of Patent: Aug. 30, 2011

(54) MANAGEMENT OF QUEUES IN CONTACT CENTRES

(75) Inventors: Tony McCormack, Galway (IE); Nithyaganesh Kirubalaratnam, Galway (IE); Neil O'Connor, Galway (IE)

(73) Assignee: Nortel Networks Limited, Mississauga, ON (CA)

( * ) Notice: Subject to any disclaimer, the term of this patent is extended or adjusted under 35 U.S.C. 154(b) by 1401 days.

(21) Appl. No.: 10/645,438

(22) Filed: Aug. 21, 2003

(65) Prior Publication Data

US 2005/0044129 A1 Feb. 24, 2005

(51) Int. Cl.
*G06F 15/16* (2006.01)
*H04M 3/00* (2006.01)
*G06Q 10/00* (2006.01)
(52) U.S. Cl. .................. 709/206; 379/266.01; 705/9
(58) Field of Classification Search .............. 379/266.01, 379/266.1; 719/315; 370/338; 709/200, 709/206; 707/209; 705/9
See application file for complete search history.

(56) References Cited

U.S. PATENT DOCUMENTS

| | | | | |
|---|---|---|---|---|
| 6,535,601 | B1 * | 3/2003 | Flockhart et al. | 379/266.01 |
| 6,883,006 | B2 * | 4/2005 | Webber | 707/100 |
| 6,910,053 | B1 * | 6/2005 | Pauly et al. | 707/203 |
| 7,092,509 | B1 * | 8/2006 | Mears et al. | 379/266.01 |
| 7,117,244 | B2 * | 10/2006 | Florman et al. | 709/203 |
| 7,161,925 | B2 * | 1/2007 | Wallenius et al. | 370/338 |
| 7,174,556 | B2 * | 2/2007 | Lambert | 719/315 |
| 2002/0147700 | A1 * | 10/2002 | Webber et al. | 707/1 |
| 2003/0154244 | A1 * | 8/2003 | Zellers et al. | 709/203 |
| 2004/0193475 | A1 * | 9/2004 | Hemm et al. | 705/9 |

FOREIGN PATENT DOCUMENTS

EP 0949794 10/1999

OTHER PUBLICATIONS

XP2392319A Michael T. Goodrich, Roberto Tamassia and John Wiley & Sons, Inc. "Lists and Sequences" Sep. 2, 2002.

* cited by examiner

*Primary Examiner* — Philip J Chea
(74) *Attorney, Agent, or Firm* — Barnes & Thornburg LLP

(57) ABSTRACT

Contacts are managed within a contact centre by representing each contact as a software object which contains skillset and priority identifiers. Contact objects are queued relative to one another by means of references to and/or from the object(s) immediately ahead of and behind each contact. In this way a conventional queue can be dispensed with. Queries can be made to a plurality of contact centres across a network to identify objects matching certain criteria at the top of each local queue. In this way a set of local queues substitutes for a network queue providing increased resilience in the case of the failure of any individual component of the network or of the network itself.

16 Claims, 5 Drawing Sheets

MANAGEMENT OF QUEUES IN CONTACT CENTRES

FIELD OF THE INVENTION

The present invention relates to the management of queues in contact centres. It has particular application in contact centres which are networked together.

BACKGROUND OF THE INVENTION

Contact centres receive contacts in many forms, such as telephone calls, chat session requests, emails, video calls, etc. Such contacts must be processed and this usually means that they are assigned to agents based on the skillsets needed to effectively deal with the contacts. Because agents deal with many contacts throughout the day and the load on the centre varies over time, it is necessary to maintain queues both of contacts which are waiting to be assigned and of agents who are ready for the next suitable contact.

In conventional contact centres, contacts are first routed through a workflow designed to determine the priority of the contact and the skillset(s) required to deal with the contact (indeed the skillset may determine the priority rating assigned to a contact). In the case of voice calls, the call will then be typically held at a private branch exchange (PBX) or a call server, and an identifier for that call will then be passed, along with the results of the workflow routing, to a contact queuing module (or "queue manager").

The queue manager maintains one or more queues or lists of contact identifiers, and new contacts are inserted into the appropriate queue based on skillset determinations from the workflow, and at the point in the queue determined by the priority assigned to the contact by the workflow process.

Where contact centres are networked together, the ideal distribution of new and waiting contacts is one in which the load is evenly balanced across the individual nodes (contact centres). One approach is to use a network contact router which is the entry point for all contacts entering the network (i.e. irrespective of which contact centre receives the contact initially, the responsibility for routing the contact is made by the network router. The network contact router receives statistical information from each node and from this information a decision is made as to which node is "most available" based on the activity level of each node. Each new contact is diverted to the currently most available node. A problem with this approach is that it does not deal directly with individual agent availability. A further problem is that the method does not guarantee even distribution particularly when agents are only idle for very short times.

An alternative approach is for the network contact router to directly monitor the activity of each agent, by receiving event reports from each node (an event in this sense might be that a contact has been passed to an agent, or that an agent has logged off for a break, or that an agent has become free. While this provides a more "hands on" approach in which agent availability is dealt with directly, it is very sensitive to failure of the network queue. Should this fail, then the entire queue needs to be rebuilt from scratch when service has been restored. In networked multimedia contact centres, there may be thousands of agents and millions of queued contacts at any given time, so rebuilding the queue takes considerable time and requires considerable resources.

A different approach is one in which each node maintains its own queue and deals with its own received contacts. Only when there is a shortage of resources is a contact transferred to another node with spare capacity. This approach has the disadvantage that contacts are not evenly distributed through the network, and inefficiencies such as over- and under-staffing can occur at different times of the day at individual nodes when in fact the network as a whole might be able to handle the aggregated contacts more efficiently.

SUMMARY OF THE INVENTION

The invention provides, in a first aspect, a method of managing contacts within a contact centre, comprising the steps of:
  assigning to a received contact a priority and a skillset identifier, whereby the contact can be prioritised relative to other contacts;
  creating a software object for said contact;
  determining a queuing position for said object relative to at least one other object representing a contact having a similar skillset identifier; and
  adding to said object a reference to said at least one other object,
whereby a collection of such objects each containing a reference to at least one other object provides a prioritised queue for a skillset.

This method of managing contacts is very different to a traditional queue. Instead of the queue being provided as a list of contact IDs, each contact is represented by an object which includes a forward and/or backward reference to the contact(s) immediately ahead or behind. In this way, each node (e.g. each contact centre) can maintain its own queue and a stateless network queuing facility can be introduced to query the object at the top of each queue in the node and determine which is most suitable for an agent who has become available.

Preferably, said object includes references to two other contacts having a similar skillset identifier, denoting the contacts immediately ahead of and behind it within a queue, apart from the case in which the object is positioned at an end of a queue.

In this way, a new object can be inserted into the queue at any position by simply adding to the new object references to the objects between which it is inserted (those immediately ahead and behind), and modifying those objects to refer to the new contact rather than to one another. The contact at the head of the queue can also be identified by the fact that it has no forward reference (though a flag may be added to that contact also), and that at the tail can be identified by the lack of a backward reference.

The term "object" encompasses structures implemented using programming systems and languages which are not object-orientated.

Preferably, therefore, the method comprises the additional step of modifying said at least one other object with a reference to the newly created object.

In preferred embodiments, when the received contact is assigned multiple skillset identifiers, the corresponding object can include separate references to objects in different queues. In this way each object might simultaneously be holding a position in several queues at once.

Preferably, the method further comprises the step of responding to a network request by sending over the network details of those objects at the head of a queue matching criteria specified in the request.

When this is done by a number of contact centres in a network, a network routing agent can quickly poll each contact centre for the top priority contact held at each centre meeting certain skillset criteria, and from the responses, choose the highest priority contact for assignment to an available agent.

Should the network routing agent fail, then when service is restored it can immediately resume service due to the fact that the objects are maintained locally at each node. Additionally, a local queuing component can initiate queuing service in the event of a failure of the network queuing service In a preferred embodiment, the objects are created and maintained by a contact manager, and a queuing module carries out said determination of said queuing position according to information associated with the new object, the queuing module being further capable of adding said reference to said object.

In this way, all of the contacts are held together and the creation of a new object is followed by the queuing module assigning to the new object a position relative to one or more existing objects.

Preferably, the contact manager has a memory space in which objects are stored, and the queuing module has a memory space in which objects are updated, and said memory spaces either form part of a common space or a replication service is provided to update changes to an object effected in one of the memory spaces with corresponding changes to a copy of the object in the other of the memory spaces.

The invention also provides a method of distributing contacts across a network of contact centres, wherein each contact is represented by a software object maintained at a contact centre, each said software object containing references to one or more other software objects maintained at the same contact centre to provide a queue of objects at each contact centre, wherein the method comprises:
  upon a network resource having the capability of handling contacts with certain criteria becoming available, requesting from each contact centre the highest priority queued object matching said criteria;
  receiving information relating to each such highest priority queued object from said contact centres;
  determining which object represents the contact with the highest priority and/or best match for the available resource; and
  issuing routing instructions to cause said contact to be routed to the resource.

The act of requesting from each contact centre the highest priority queued object physically may not require a network request if the memory area maintained by the nodal contact modules and network queue manager are synchronised using a replication service.

Preferably, the contact centre which maintained the object representing the selected contact carries out the further step of removing the selected object from its queue and updating those objects which contain references to the selected object, to thereby update the top of one or more queues represented at that contact centre by a collection of objects.

While the preferred embodiment treats an agent as being a "network resource" which is available to handle a contact, each contact centre could itself be a network resource in this sense.

In another aspect the invention provides a computer program product comprising instructions in machine readable form which when executed in a computer system for managing contacts at a contact centre are effective to cause the computer system to:
  assign to a received contact a priority and a skillset identifier, whereby the contact can be prioritised relative to other contacts;
  create a software object for said contact;
  determine a queuing position for said object relative to at least one other object representing a contact having a similar skillset identifier; and
  add to said object a reference to said at least one other object,
whereby a collection of such objects each containing a reference to at least one other object provides a prioritised queue for a skillset.

The computer program product comprises a computer-readable medium. It may be a carrier such as a magnetic or optical disk (e.g. a hard drive, a tape for a tape drive, a floppy disk, compact disk or digital versatile disk). It may also be hard-wired in an electronic circuit of a processor.

It will be appreciated by those skilled in the art that a computer system for carrying out the instructions referred to above can be represented by a number of computers each carrying out different interrelated tasks, or by a dedicated electronic circuit (e.g. provided in a PBX) which is either programmable or which encodes the instructions referred to above.

In another aspect the invention provides a computer program product comprising instructions in machine readable form which when executed in a computer system provided in a network of contact centres are effective to cause the computer system to:
  upon a network resource having the capability of handling contacts with certain criteria becoming available, request from each contact centre a highest priority queued object representing a contact queued at that contact centre which matches said criteria;
  receive information relating to each such highest priority queued object from said contact centres;
  determine which object represents the contact with the highest priority and/or best match for the available resource; and
  issue routing instructions to cause said contact to be routed to the resource.

In another aspect the invention provides a system for managing contacts in a contact centre, the system comprising:
  a workflow processor for assigning to a received contact a priority and a skillset identifier, whereby the contact can be prioritised relative to other contacts;
  an object creation module for creating a software object for said contact;
  a queuing manager for determining a queuing position for said object relative to at least one other object representing a contact having a similar skillset identifier; and
  an object modification module for adding to said object a reference to said at least one other object,
whereby a collection of such objects each containing a reference to at least one other object provides a prioritised queue for a skillset.

In a further aspect the invention provides a system for distributing contacts across a network of contact centres, wherein each contact is represented by a software object maintained at a contact centre, each said software object containing references to one or more other software objects maintained at the same contact centre to provide a queue of objects at each contact centre, wherein the system comprises:
  a request generator for generating a request, upon a network resource having the capability of handling contacts with certain criteria becoming available, said request being effective to determine from each contact centre the highest priority queued object at that contact centre matching said criteria;
  a network connection for forwarding said request to each contact centre and receiving therefrom information concerning the highest priority queued object at each contact centre matching said criteria;

comparison means for determining which object represents the contact with the highest priority and/or best match for the available resource; and a routing instruction generator for issuing routing instructions to cause said contact to be routed to the resource.

The invention further provides a software object representing a contact at a contact centre, said object including a reference to one or more other such objects located immediately ahead of or behind said object in a queue, the object further comprising an identifier to the contact which it represents and a skillset identifier enabling it to be identified in a search for objects representing contacts which match given skillset criteria.

In another aspect the invention provides a virtual queue of contacts, wherein each contact within the queue is represented by a software object as defined above, and the order of contacts within the queue is determinable from the aggregated references between objects.

The virtual queue can comprise a single collection of software objects (e.g. stored in the memory area(s) of one contact centre) or it may comprise a set of collections of software objects, each collection being independently maintained in a respective contact centre within a contact centre network.

BRIEF DESCRIPTION OF THE DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
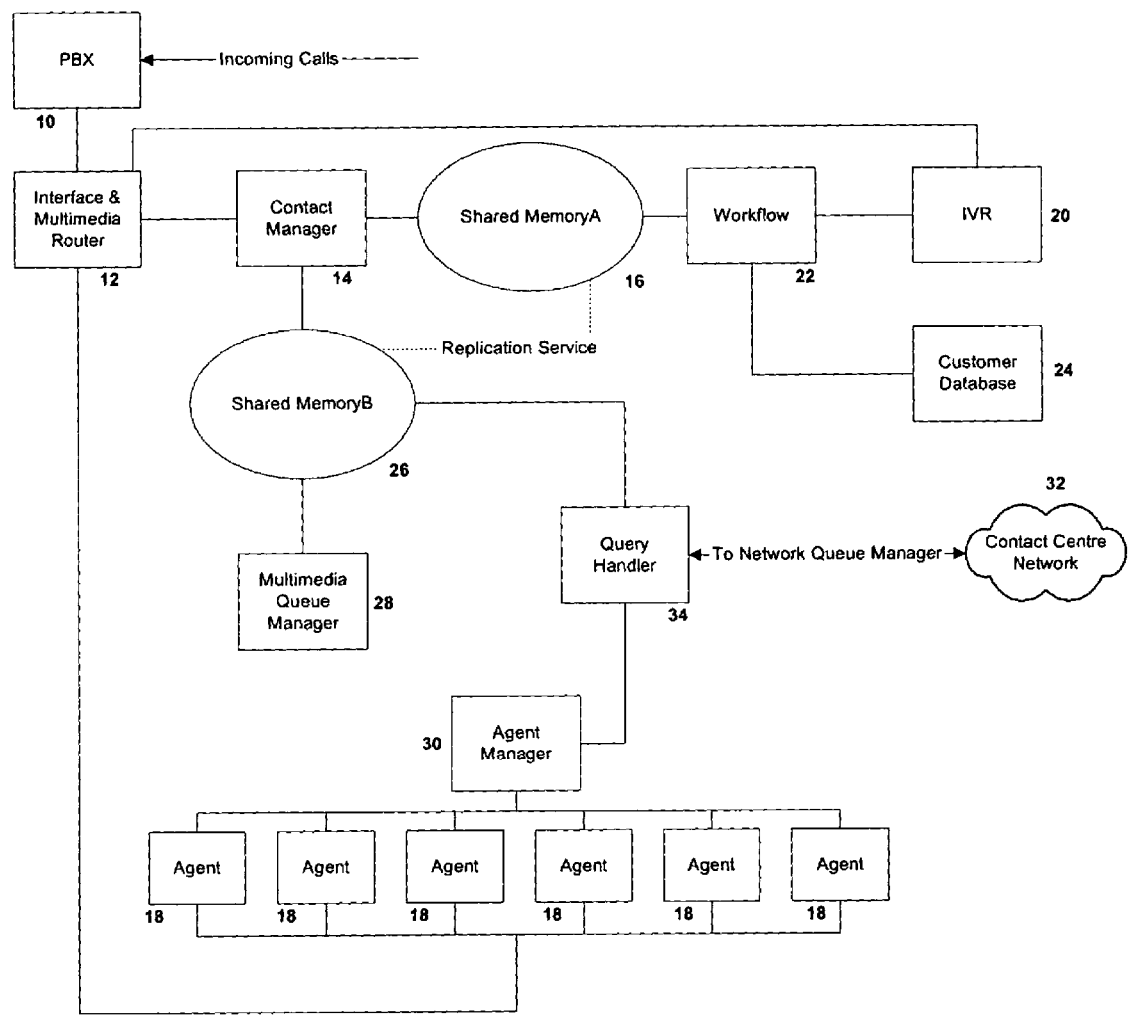
FIG. 1 is an architecture of a contact centre.

In FIG. 1 the main components or processes of a contact centre as they relate to the present invention are shown. Such additional conventional details of a contact centre as are required for a complete architecture will be well known to the skilled person. The operation of the contact centre is illustrated with reference to voice calls but the same method of operation can be used for any other type of contacts such as emails, chat session requests, video calls, etc.

Incoming contacts are received at a contact server, which in the case of voice calls is a private branch exchange 10 (PBX) such as the Meridian series of PBXs available from Nortel Networks ("Meridian" is a Trade Mark of Nortel Networks). The PBX is connected to and receives calls both from the public switched telephone network (PSTN) and from data networks such as the Internet and corporate intranets and wide area networks (via a suitable gateway, not shown).

Figure 2:
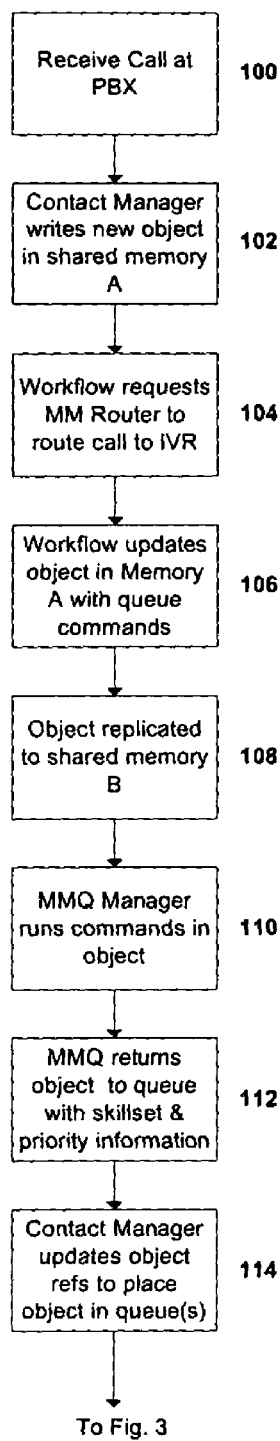
FIG. 2 is a flowchart illustrating the steps leading up to a contact being queued.

Referring additionally to FIG. 2, which shows the steps described below in flowchart format, the PBX answers each call, step 100, and holds it while details of the call (such as the port on which it is held and the origin of the call, e.g. the calling line ID or the IP address of the calling terminal) are passed via a proprietary protocol to an interface and multimedia router 12. The multimedia router notifies the details of the call to a contact manager 14, which generates a software object containing the details of the call in a shared memory area 16 (Memory Area "A"), step 102.

The multimedia router is adapted to generate commands to the PBX using a proprietary protocol to cause the calls to be routed to whichever location has been identified for the call (such as an agent 18 of the call centre or another contact centre forming part of a common network of contact centres). The multimedia router, as its name implies, will typically handle other media types also, so it might be in communication with and in control of an email server, a videoconferencing server, and a chat server, for example. For simplicity it is described only in operation with voice calls. The Workflow receives an event relating to the availability of a new contact The contact manager is designed to manage a local queue of contacts (or more specifically, software objects representing contacts). Both the workflow 22 and the multimedia router 12 are typically embodied in software running on a computer having a suitable interface to enable communication with other components of the system. They can be run on the same computer or on different computers, and it will be appreciated that the details of the implementation are not critical to the principles of operation of the system. These components (as well as those described below in functional terms) could equally be embodied in dedicated hardware in which the program instructions are hardwired in an electronic circuit.

The contact manager 14 next requests, step 104, the multimedia router 12 to direct the call to an interactive voice response (IVR) server 20 which directs the caller to respond to a series of prompts arranged in a suitable menu structure which the caller typically navigates using tones generated by the numbers on a handset. When the call is transferred to the IVR server 20, a workflow process manager 22 locates the object in memory area A corresponding to the call (identifiable by the details of the contact held in the object) and updates the object in accordance with the output of the IVR process, step 106.

Typically, the object is updated by adding a set of data based on the responses given by the caller, and based on customer details accessible from a customer details database 24 (if the identity of the caller can be determined from e.g. the calling line ID or information input by the caller during the IVR session), and these data are effective to act as a set of commands to a multimedia queue (MMQ) manager to enable the MMQ manager to determine a priority rating for the call and to identify the skillsets required for an agent to deal with the call, as will be described below.

The mechanism whereby the MMQ manager and the workflow process manager can each access the shared memory area and update contacts therein is at the choice of the system designer. For example, the shared memory may be a memory area in a memory of a computer in which both the contact manager and the workflow manager are running. Alternatively, the memory area can be duplicated in two locations, i.e. at the contact manager 14 and the workflow manager 22, and a replication service running in each location can notify its counterpart to update an object with any changes made locally. In this way, the two physically distinct memory areas can together form a unified virtual memory area which is accessible by both processes. Preferably, shared memory areas A and B are synchronised, leading to the situation where a contact created/updated in A is automatically created/updated in B (and vice versa).

The call is returned to the PBX by the MM router 12 when the IVR process is terminated, and when the contact manager determines that the corresponding object has been updated by the workflow process manager, it removes the object from shared memory area A and a replication service transfers it to a second shared memory area 26 (Memory Area "B"), step 108. The MMQ manager is adapted to convert the workflow output (which it reads from each object in memory area B) into queuing commands. It does this, step 110, by assigning one or more skillset identifiers to the contact based on the information collected in the workflow process (and according to locally adjustable rules which take account of the skillsets maintained in that contact centre) and by assigning a priority rating based on the identity of the caller and the skillset determinations, in known manner. For example, calls received from particular numbers or made to restricted access numbers might get higher or lower priorities, and calls including a "sales" skillset might be rated higher than those which do not include that skillset. The management personnel of the contact centre can vary the priority ratings and skillset determinations to take account of locally varying factors.

The MMQ updates the object with the priority and skillset identifiers and this then allows the contact manager to "queue" the object with reference to other waiting contacts (or more accurately, the objects corresponding to other waiting contacts). The contact manager does not maintain a queue in the traditional sense, in which a list of contact identifiers is maintained. Instead, as will be more fully described below, it provides each object with information about the contact immediately ahead and/or behind it in the queue so that each object "knows" its place in the queue and the contact manager does not need to keep track of a list of objects. Thus, in step 114, the contact manager reads the priority and skillset information and from this determines which object(s) are immediately ahead and/or behind it in the queue, and the relevant objects are then updated to refer to one another. This process will now be described more fully with reference to FIGS. 3, 4 and 5.

Figure 3:
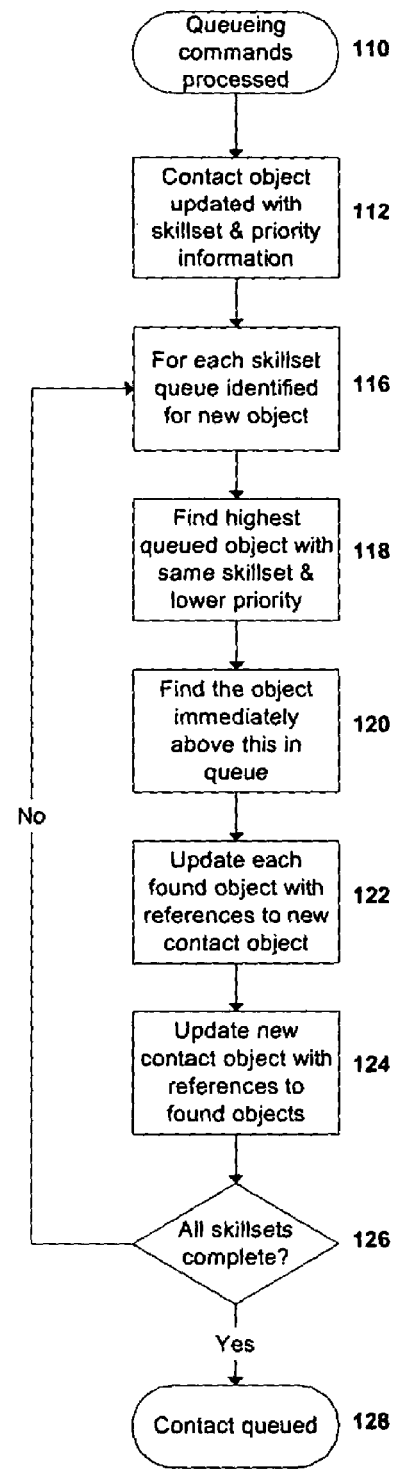
FIG. 3 is a flowchart of the process of placing a contact in a queue.
Figure 4:
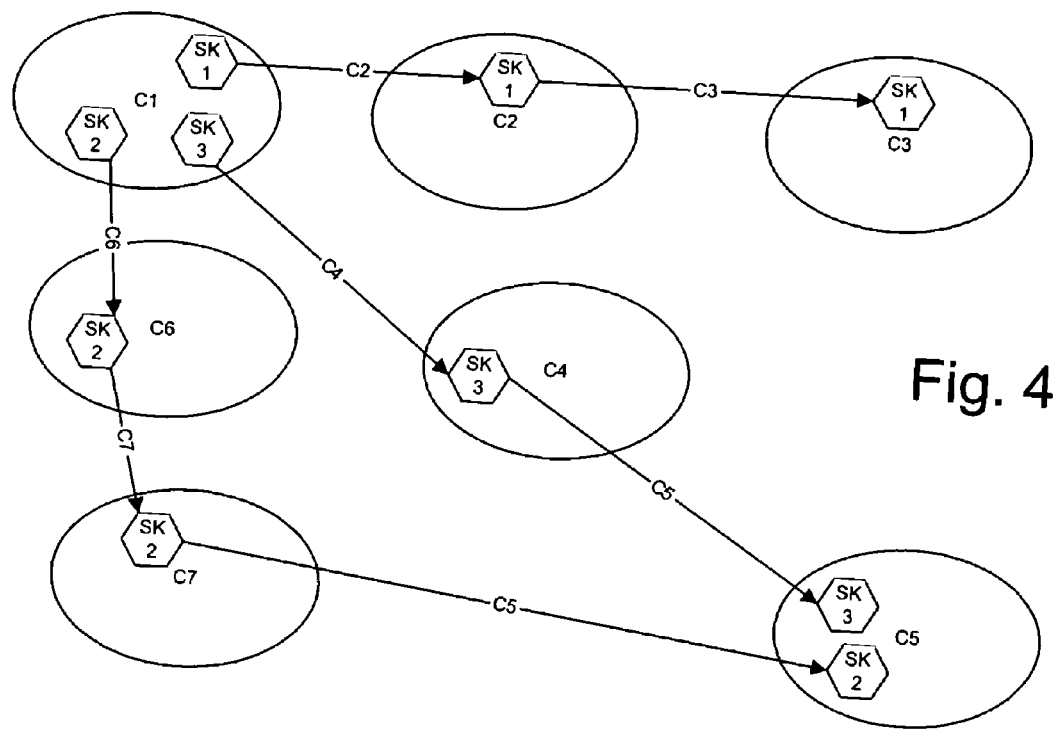
FIG. 4 is a schematic representation of a queue before a new contact has been added.

FIG. 3 starts with steps 110 and 112 in which the MMQ manager runs the "queuing commands", i.e. processes the data in the object, and then writes to the object with the skillset and priority information. Each contact may have more than one skillset identifier (e.g. "sales", "new customer" and "product ID no. 12345"), and it is therefore placed in the queues for each skillset. The contact manager processes each skillset identified in the object in turn, step 116, and finds for that skillset the object with the priority immediately below that of the newly updated contact, step 118. A small collection of queued objects in a memory area are illustrated schematically in FIG. 4 before the new object has taken its place in the queues.

Each contact object (C1-C7) includes at least one skillset identifier and at least one reference to an object immediately above or below it in a queue for that skillset. Thus, the queue for skillset SK1 comprises, in decreasing order of priority, objects C1, C2 and C3. The queue for skillset SK2 comprises, again in decreasing order of priority, objects C1, C6 and C7, and that for skillset SK3 comprises C1, C4 and C5.

Objects at the top of a queue (in this case C1 is at the top of the three queues) are identifiable by the lack of a forward reference (C1 refers back to C2, C4 and C6). Objects at the bottom of a queue are identifiable by the lack of a backward reference (thus C3 at the bottom of queue SK1 has only a forward reference to C2 and C5 at the bottom of queues SK2 and SK3 has only forward references to C7 and C4).

Taking the example of a new contact object, C8, which is assigned to skillsets SK2 and SK3, with priority ratings higher than C7 (in queue SK2) and higher than C5 (in queue SK3), the contact manager identifies C7, when processing the SK2 skillset identifier of object C8 in step 118, as the highest priority queued object with a lower priority in that skillset queue. From the forward reference in C7, the contact manager can then determine that C6 is immediately above this in the queue, step 120. (It should be noted that C6 and C8 may have identical priorities, in which case C6 is placed above C8 as being an older contact.)

In order to place C8 between C6 and C7, the contact manager modifies, step 122, the backward reference in C6 to refer to C8 (rather than C7) and modifies the forward reference in C7 to refer to C8 (rather than C6). Then, the C8 object is modified by adding forward and backward references to C6 and C7, respectively. The C8 object is then considered to be queued for skillset SK2.

The contact manager checks, in step 126, whether the object is queued in each of its skillsets, and repeats steps 116-124 as many times as necessary until the object is queued in each skillset, step 128.

Figure 5:
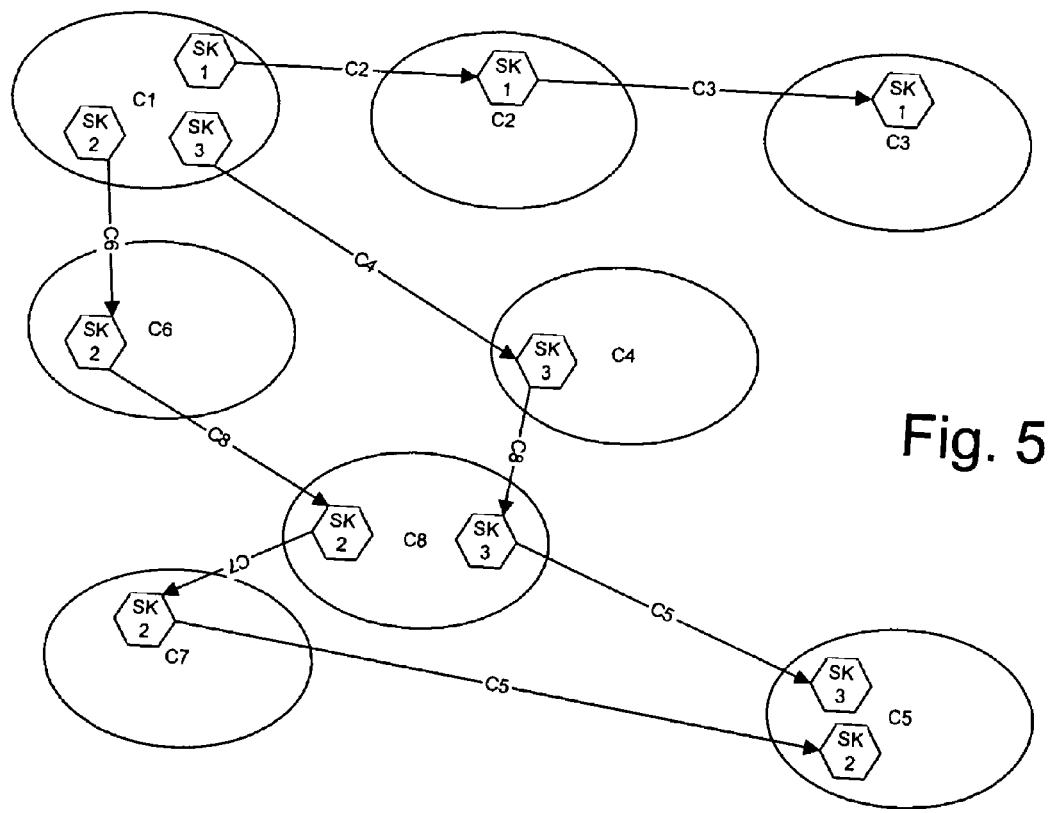
FIG. 5 is a schematic representation of a queue after a new contact has been added.

The result of this process can be seen in FIG. 5, where C8 is now queued (by virtue of the inter-object references) between C6 and C7 in queue SK2 and between C4 and C5 in queue SK3. Apart from the objects immediately ahead of and behind the new object, the remaining objects in the memory area are unchanged.

Figure 6:
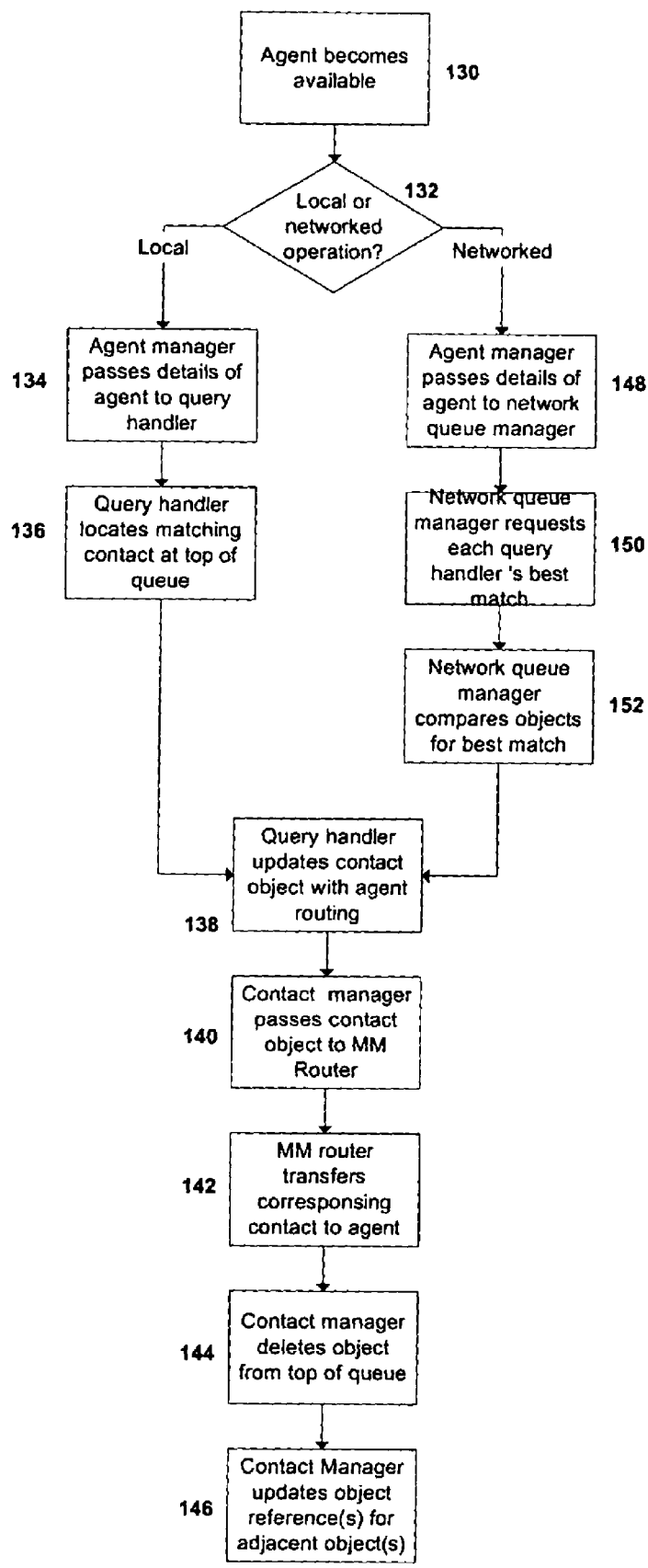
FIG. 6 is a flowchart of the process of assigning a contact to an agent.

FIG. 6 shows how objects are removed from the queues when an agent becomes available, step 130. Referring first back to FIG. 1, an agent manager 30 monitors the activities of each agent in known manner and generates event reports as the status of each agent changes (such as an agent logging on/off, an agent becoming engaged in a call or an agent becoming free after a call).

Figure 7:
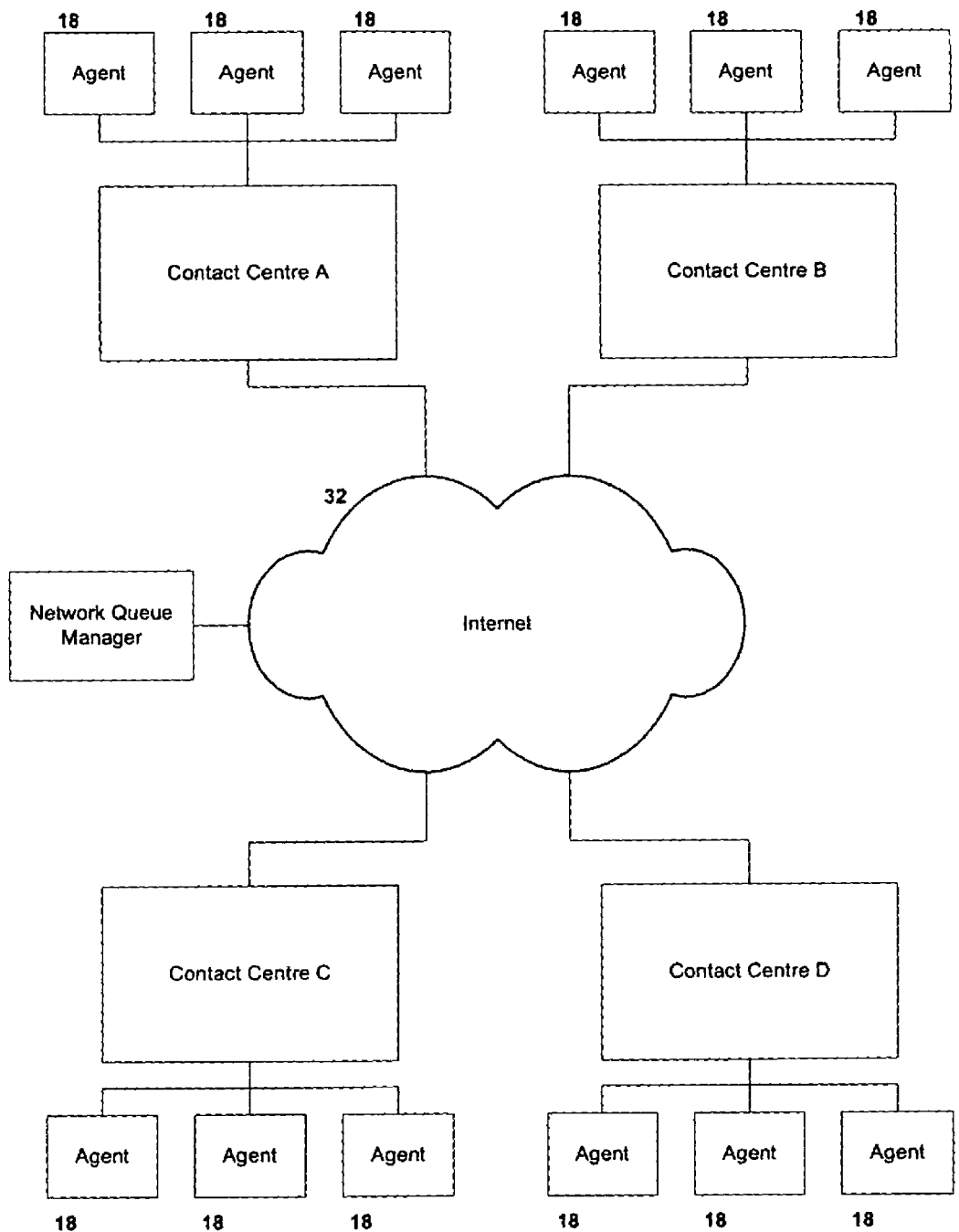
FIG. 7 is an architecture of a contact centre network.

The contact centre can operate independently of other contact centres or it can form part of a larger networked contact centre (via the Internet 32, for example). FIG. 7 shows a contact centre network comprising a number of contact centres 160 (each of which may be as shown in FIG. 1) connected to the Internet 32. Each contact centre 160 has a plurality of network resources (in this case, agents 18) which are available to service contacts received either via the Internet or over the PSTN (not shown in FIG. 7). A network queue manager 162 operates as described below to control the assignment of contacts to agents.

A method of handling the local scenario and a method of handling the networked scenario will be described. (It is to be noted that a contact centre can operate in both local and networked modes simultaneously—for example an agent may have some skills which are used only on contacts received locally, whereas other skills may be applicable in other contact centres across the network.) A query manager 34 (FIG. 1) is programmed to decide if the contact centre should act in a local mode or a networked mode when a particular agent 18 becomes available, decision 132 in FIG. 6. It might be the case that some agents are in high demand across the network and others (for example due to language abilities) are only in demand locally. Alternatively, the contact centre might be a freelance centre which sells its services to various enterprises and therefore moves in and out of networks of contact centres over time. Yet again, the decision might depend on the availability of a network connection or the quality of service at a given time. As another example, the decision to operate locally or in a network might depend on how busy the centre is or how busy other centres are within the network. The decision made in step 132 can either be automatic or it can be made by a supervisor controlling the query handler 34.

Dealing first with the local mode of operation, the newly available agent will obviously be assigned a contact from among those held locally and identified by a queued object in memory area B. The details of the agent (perhaps simply an identifier if the query handler has access to the skillsets of the agent, or a listing of the agent's skillset abilities if the query handler does not) are passed to the query handler, step 134. The query handler 34 accesses the memory area B and determines, step 136, which contact at the top of a queue (identified by a lack of a forward reference) is most suited to the skillset of the agent. That contact object is then updated with a "route to agent" instruction identifying the agent, step 138.

When the contact manager 14 notes that an object has been updated in this way, it sends the contact object, step 140, to the MM router 12 which in turn instructs the PBX, step 142, to transfer the call to the extension or workstation of the identified agent. When transfer of the contact is confirmed by the MM router 12, the contact manager 14 deletes the corresponding object reference from the top of the queue, step 144 and then adjusts any references to this deleted object in other objects accordingly to place the next highest priority queued object(s) at the tops of their respective queues, step 146.

If the contact centre is operating as part of a network of contact centres when the agent becomes free (as determined in decision 132), the details of the agent are passed from the agent manager via the query handler to a network queue manager 162 (FIG. 7) via the network 32. The function of the network queue manager is to determine the best contact across the network for that agent, and it does this by requesting the query manager in each contact centre for its best local match, step 150. A network queue manager could be available at each contact centre rather than having a single manager for the entire network.

When the responses of each query manager are received back the network queue manager compares the results to determine which contact should be assigned to the agent, step 152. Following this determination, the network queue manager instructs the local query handler of the centre holding the contact to cause the contact to be transferred to the agent in question, in accordance with steps 138-146 described above. Of course if the agent and the contact are not in the same contact centre, then the contact object will be updated with an agent reference which contains sufficient information to allow the contact to be transferred by the PBX and the MM router to the relevant contact centre across the network where the agent is located, and the local MM router at that centre will connect the contact with the agent. Note that batching individual updates from each agent manager and contact manager to/from the network queue manager using a replication service enables efficient real-time operation It is to be noted that the network queue manager is stateless, i.e. does not maintain any queues. Thus in the event of a failure of the network connection to any contact centre, then that centre can continue to operate locally and the remaining contact centres operate together as before. If the network queue manager itself fails, then each centre can operate independently without any setback. As soon as the network queue manager is again available, it benefits from the fact that it is stateless and can immediately resume routing contacts to agents without any need to rebuild queues.

The invention is not limited to the embodiments described herein which can be varied without departing from the scope of the invention.

What is claimed is:

1. A method of managing contacts within a contact centre, comprising the steps of:
    assigning to a received contact a priority and a skillset identifier;
    creating a new software object for said received contact;
    determining a queuing position for said new software object relative to at least one other software object representing a contact having a priority and a skillset identifier similar to said skillset identifier assigned to said received contact, wherein said queuing position is determined from a comparison of the priority of the received contact and a priority of the contact represented by the at least one other software object;
    adding to said new software object a pointer to said at least one other software object; and
    storing in memory a collection of said software objects each containing said pointer to at least one other of said software objects;
    whereby said stored collection of said software objects provides a prioritised queue for a skillset, wherein the step of assigning to said received contact said priority and said skillset identifier includes assigning multiple said skillset identifiers, and wherein the step of adding said pointer comprises adding separate pointers to software objects in different queues.

2. The method as claimed in claim 1, wherein said new software object includes pointers to two other software objects having said similar skillset identifier, said two other software objects representing the contacts immediately ahead of and behind said contact within a queue, except in the case in which the new software object is positioned at an end of said queue.

3. The method as claimed in claim 1, further comprising the step of modifying said at least one other software object with a pointer to the new software object.

4. The method as claimed in claim 1, further comprising the step of responding to a network request by sending over a network details of those software objects at a head of a queue matching criteria specified in the request.

5. The method as claimed in claim 1, wherein the software objects are created and maintained by a contact manager, and a queuing module carries out said determination of said queuing position according to information associated with the new software object, the queuing module being further capable of adding said pointer to said new software object.

6. The method as claimed in claim 5, wherein the contact manager has a memory space in which said software objects are stored, and the queuing module has a memory space in which said software objects are updated, and said memory spaces either form part of a common space.

7. The method as claimed in claim 6, wherein the contact manager has a contact manager memory space, and the queuing module has a queuing module memory space, and wherein each of said software objects is stored in two corresponding copies, a first of said copies being stored in the queuing module memory space and a second of said copies being stored in the contact manager memory space, and wherein a replication service is provided which is configured to ensure that changes to the first of said copies are reflected in corresponding changes to the second of said copies, and that changes to the second of said copies are reflected in corresponding changes to the first of said copies.

8. A method of distributing contacts across a network of contact centres, wherein each contact having an assigned priority is represented by a software object maintained at one of said contact centres, each said software object containing pointers to one or more other of said software objects maintained at the same contact centre to provide a prioritized queue of software objects at each said contact centre, wherein each software object is positioned in the prioritized queue in order of priority with respect to the one or more other software objects, and at least some of the software objects containing separate pointers to software objects in different queues wherein the method comprises:

upon a network resource having the capability of handling said contacts with certain criteria becoming available, requesting from each said contact centre the highest priority queued software object matching said criteria;

receiving information relating to each such highest priority queued software object from said contact centres;

determining which software object represents the contact with the highest priority and/or best match for the available resource; and issuing routing instructions to cause said contact to be routed to the resource.

9. The method as claimed in claim 8, wherein the contact centre which maintained the software object representing the selected contact carries out the further step of removing the selected software object from its queue and updating said software objects which contain said pointers to the selected software object, to thereby update the top of one or more of said queues represented at said contact centre by a collection of said software objects.

10. A method of distributing contacts across a network of contact centres, wherein each contact having an assigned priority, is represented by a software object maintained at a contact centre, each said software object containing pointers to one or more said software objects maintained at the same contact centre to provide a prioritized queue of said software objects at each said contact centre, wherein each software object is positioned in the prioritized queue in order of priority with respect to the one or more other software objects, and at least some of the software objects containing separate pointers to software objects in different queues, wherein the method comprises:

maintaining a network queue of contacts by automatically replicating changes in contact software objects at each contact centre with corresponding changes in contact software objects in said network queue;

upon a network resource having the capability of handling contacts with certain criteria becoming available, determining from the network queue the highest priority queued software object matching said criteria; and issuing routing instructions to cause said contact to be routed to the resource.

11. A computer program product comprising a non-transitory computer-readable medium storing and/or recording instructions in machine readable form which when executed in a computer system for managing contacts at a contact centre are effective to cause the computer system to:

assign to a received contact a priority and a skillset identifier;

create a new software object for said received contact;

determine a queuing position for said new software object relative to at least one other software object representing a contact having a similar skillset identifier, wherein said queuing position is determined from a comparison of the priority of the received contact and a priority of the contact represented by the at least one other software object;

add to said new software object a pointer to said at least one other software object, and store in memory a collection of said software objects each containing said pointer to at least one other of said software objects;

whereby said stored collection of said software objects provides a prioritised queue for a skillset, wherein the assignment to said received contact of said priority and said skillset identifier includes assigning multiple said skillset identifiers, and wherein the adding of said pointer comprises adding separate pointers to software objects in different queues.

12. A computer program product arranged to distribute contacts across a network of contact centres, wherein each contact having an assigned priority is represented by a software object maintained at one of said contact centres, each said software object containing pointers to one or more other of said software objects maintained at the same contact centre to provide a prioritized queue of software objects at each said contact centre, wherein each software object is positioned in the prioritized queue in order of priority with respect to the one or more other software objects, and at least some of the software objects containing separate pointers to software objects in different queues, said computer program product comprising a non-transitory computer-readable medium storing and/or recording instructions in machine readable form which when executed in a computer system provided in a network of contact centres are effective to cause the computer system to:

upon a network resource having the capability of handling contacts with certain criteria becoming available, request from each said contact centre a highest priority queued software object representing a contact queued at said contact centre which matches said criteria;

receive information relating to each of said highest priority queued software objects from said contact centres;

determine which of said software objects represents the contact with the highest priority and/or best match for the available resource; and issue routing instructions to cause said contact to be routed to the resource.

13. A computer-implemented system for managing contacts in a contact centre, the system comprising:

a workflow processor for assigning to a received contact a priority and a skillset identifier;

an object creation module for creating a new software object for said contact;

a queuing manager for determining a queuing position for said new software object relative to at least one other software object representing a contact having a skillset identifier similar to said skillset identifier assigned to said received contact wherein said queuing position is determined from a comparison of the priority of the received contact and a priority of the contact represented by the at least one other software object;

a software object modification module for adding to said software object a pointer to said at least one other software object, and a memory for storing a collection of said software objects each containing a pointer to at least one other software object;

whereby said stored collection of said software objects provides a prioritised queue for a skillset, wherein the assignment to said received contact of said priority and said skillset identifier includes assigning multiple said skillset identifiers, and wherein the adding of said pointer comprises adding separate pointers to software objects in different queues.

14. A computer-implemented system for distributing contacts across a network of contact centres, wherein each contact having an assigned priority is represented by a software object maintained at a contact centre, each said software object containing pointers to one or more other of said software objects maintained at the same contact centre to provide a prioritized queue of said software objects at each contact centre, wherein each software object is positioned in the prioritized queue in order of priority with respect to the one or more other software objects, and at least some of the software objects containing separate pointers to software objects in different queues, wherein the system comprises a computer, the computer comprising:

a request generator for generating a request, upon a network resource having the capability of handling said contacts with certain criteria becoming available, said request being effective to determine from each contact centre the highest priority queued software object at said contact centre matching said criteria;

a network connection for forwarding said request to each contact centre and receiving therefrom information concerning the highest priority queued software object at each said contact centre matching said criteria;

comparison means for determining which of said software objects represents the contact with the highest priority and/or best match for the available resource; and a routing instruction generator for issuing routing instructions to cause said contact to be routed to the resource.

15. A computer program product comprising a non-transitory computer-readable medium storing and/or recording instructions in machine readable form which when executed in a computer system for managing contacts at a contact centre are effective to cause the computer system to create a software object, representing a contact having an assigned priority at a contact centre, said software object including: separate pointers to each of a plurality other of said software objects located immediately ahead of or behind said software object in each of a plurality of prioritized skillset queues, wherein each software object is positioned in the prioritized skillset queues in order of priority with respect to the one or more other software objects, the software object further comprising an identifier to the contact which the software object represents and a plurality of skillset identifiers enabling the software object to be identified in a search for software objects representing contacts which match given skillset criteria.

16. A computer program product comprising a non-transitory computer-readable medium storing and/or recording instructions in machine readable form which when executed in a computer system for managing contacts at a contact centre are effective to cause the computer system to create a virtual queue of contacts wherein: each contact has an assigned priority and is represented within the queue by a software object including separate pointers to each of a plurality of other said software objects located immediately ahead of or behind said software object in each of a plurality of prioritized skillset queues, wherein each software object is positioned in the prioritized skiliset queues in order of priority with respect to the one or more other software objects, the software object further comprising an identifier to the contact which the software object represents and a plurality of skillset identifiers enabling the software object to be identified in a search for said software objects representing said contacts which match given skiliset criteria, and wherein the order of said contacts within the queue is determinable from the aggregated pointers between said software objects.

* * * * *